United States Patent [19]

Merrick

[11] 3,728,971
[45] Apr. 24, 1973

[54] TURNTABLE AND RAMP FOR SNOWMOBILES

[76] Inventor: William Merrick, 1055 Bloor Street East, Apt. 1506, Mississauga, Ontario, Canada

[22] Filed: Sept. 1, 1971

[21] Appl. No.: 176,835

[52] U.S. Cl.....................................................104/44
[51] Int. Cl................................................B60s 13/02
[58] Field of Search......................104/35, 44, 45, 46; 14/71, 72; 180/5 R; 244/114. R ; 214/334

[56] References Cited

UNITED STATES PATENTS 1,532,728  4/1925  Brobst.....................................104/45
3,143,322  8/1964  Mainwaring......................244/114 R Primary Examiner—Gerald M. Forlenza
Assistant Examiner—D. W. Keen
Attorney—J. A. Legris et al.

[57] ABSTRACT

A snowmobile can be driven up a ramp and onto a turntable having a bottom platform and a top platform. The ramp has a plurality of rear projections which rest on the bottom platform of the turntable and transmit to the bottom platform part of any weight on the ramp. The ramp has a central portion with an inclined surface up which the tread of the snowmobile can move and, on either side of the central portion, two side portions with coplanar inclined surfaces up which the skis of the snowmobile can slide. The inclined surfaces of the side portions are set back from the front edge of the central portion sufficiently far that as the snowmobile approaches the ramp the tread moves onto the central portion and transfers weight to the ramp and bottom platform of the turntable before the skis encounter the side portions and apply a rearward force to the ramp and turntable.

7 Claims, 3 Drawing Figures

PATENTED APR 24 1973
3,728,971
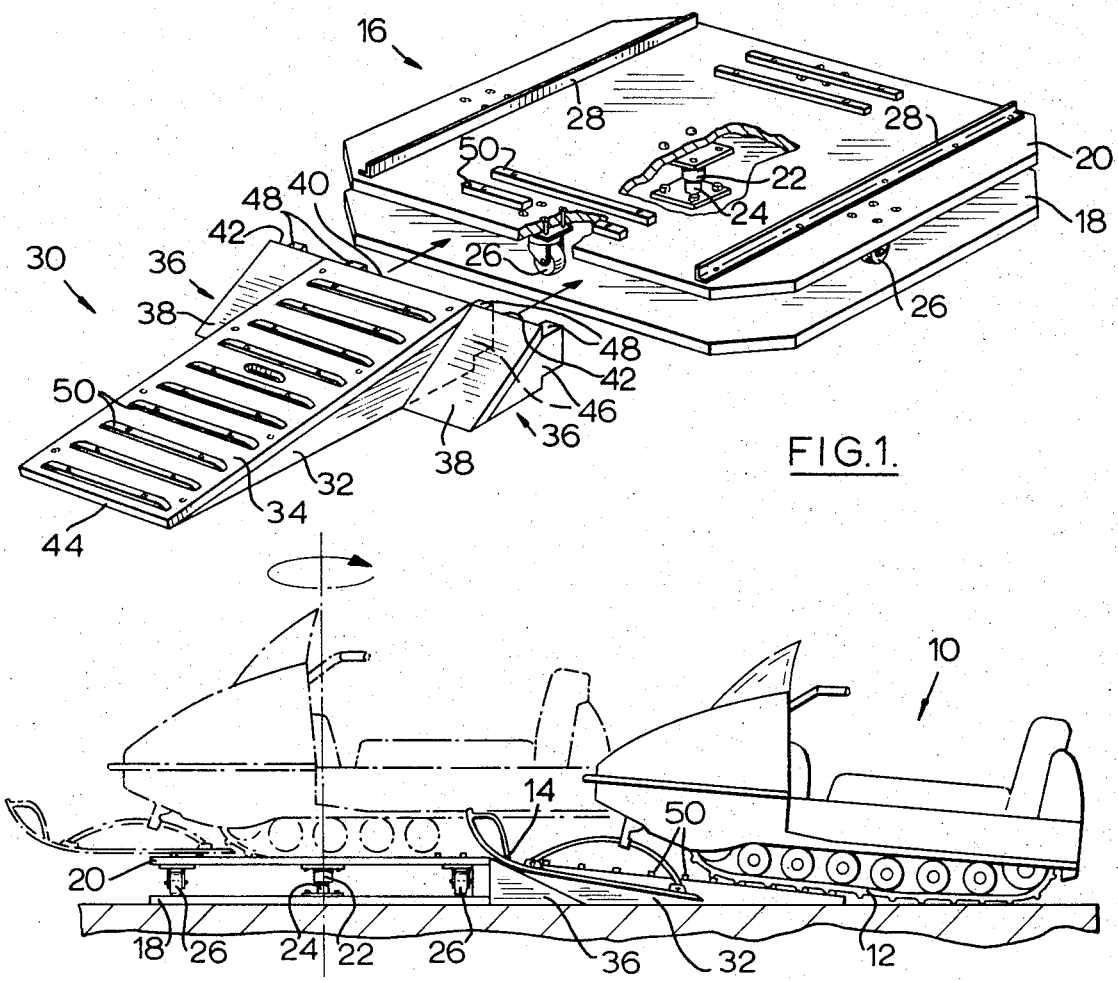
FIG.1.
FIG.2.
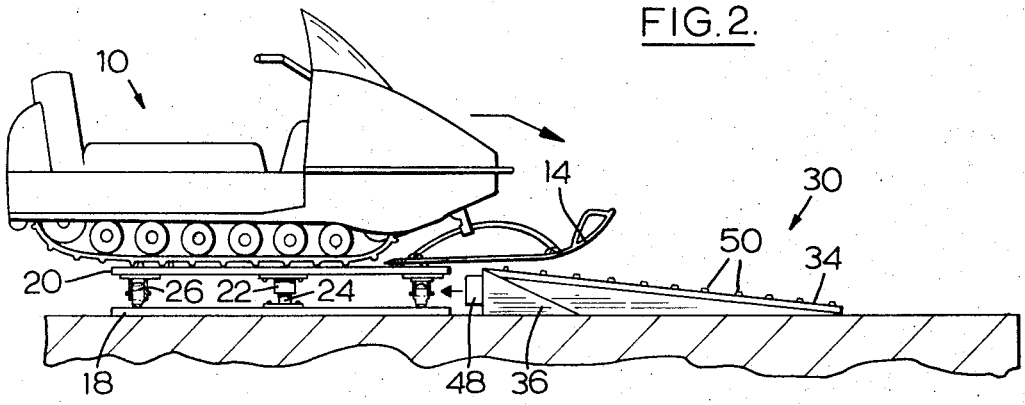
FIG.3.
INVENTOR.
WILLIAM MERRICK.
BY Maybee & Legris
ATTORNEYS

TURNTABLE AND RAMP FOR SNOWMOBILES

BACKGROUND OF THE INVENTION

1. Field of the Invention

The present invention relates to a turntable and ramp useful with snowmobiles of the type having a tread and two skis extending ahead of the ramp on either side.

2. Description of the Prior Art

Snowmobiles without a reverse gear have become popular in recent years but because of the absence of a reverse gear they must be turned around manually whenever there is not enough room to drive them forward in a wide arc. Turntables and ramps useful with vehicles such as cars and trucks are well known. A known example consists of a turntable with a wedge shaped ramp in front of it up which a vehicle can be driven onto the turntable. However if such a device were to be constructed from lightweight material such as plywood it would not be suitable for use with snowmobiles. As a snowmobile approached the front of the ramp the skis extending ahead of the snowmobile would strike the ramp and push the ramp and turntable rearward ahead of the snowmobile, the ground friction not being very great when there is no weight on the turntable or the ramp.

SUMMARY OF THE INVENTION

It is an object of the present invention to provide a turntable and ramp which can be used to turn a snowmobile around in a confined area, such as a garage. The present invention provides a turntable and ramp which are operable even when constructed from lightweight material such as plywood so that they can be portable and easily stored. According to the present invention a turntable has a ramp extending in front of it up which the snowmobile can be driven onto the turntable. The ramp has a central portion with an inclined surface up which the tread of the snowmobile can move. The central portion is sufficiently narrow to allow the skis of the snowmobile to pass on either side. The ramp has, on either side of the central portion, two side portions with inclined surfaces up which the skis of the snowmobile can slide. The inclined surfaces of the side portions are set back from the front edge of the central portion sufficiently far that as the snowmobile approaches the ramp the tread moves onto the central portion and transfers weight to the ramp before the skis encounter the side portions and apply a rearward force to the ramp. When the tread moves onto the central portion and transfers weight to the ramp the ground friction is found to be sufficient to withstand the rearward force subsequently applied to the ramp when the skis encounter the side portions, thus preventing the ramp from being pushed rearward ahead of the snowmobile even when the ramp is constructed from lightweight material such as plywood.

BRIEF DESCRIPTION OF THE DRAWINGS

In the drawings illustrating a preferred embodiment of the invention the same reference numerals designate the same parts throughout and:

FIG. 1 is a perspective view, partly broken away, of a turntable and ramp prior to being assembled together;

FIG. 2 is a side elevation showing the turntable and ramp of FIG. 1 after they have been assembled together and, in solid lines, a snowmobile beginning to move up the ramp and, in broken lines, the snowmobile resting on the turntable; and FIG. 3 is a side elevation of the turntable, ramp, and snowmobile of FIG. 2 with the ramp pulled away from the turntable and the top platform of the turntable rotated through 180° as compared to FIG. 2.

DESCRIPTION OF THE PREFERRED EMBODIMENT

The snowmobile 10 of FIG. 2 has a tread 12 and two skis 14 extending ahead of the tread on either side.

The turntable 16 of FIG. 1 has a bottom platform 18 and a top platform 20 spaced above the bottom platform and rotatable with respect to the bottom platform on a vertical spindle 24 attached to the bottom platform. The top platform is mounted on the vertical spindle by means of a bracket 22. Four equally spaced rollers 26 are located between the top and bottom platforms and are attached symmetrically near the outer edges of the top platform and rest on the bottom platform. Raised guide elements 28 are located on the top platform and are separated by a distance slightly greater than the distance between the outer edges of the skis 14 of the snowmobile 10 (FIG. 2) with which the turntable is to be used.

The ramp 30 of FIG. 1 is about the same height at the rear as the top platform of the turntable. The ramp has a central portion 32 with an inclined surface 34. The central portion is sufficiently narrow to allow the skis of the snowmobile to pass on either side. The ramp has, on either side of the central portion, two side portions 36 with coplanar inclined surfaces 38. The top edge 40 of the inclined surface 34 and the top edges 42 of the inclined surfaces 38 all lie in a horizontal straight line. The inclined surfaces 38 of the side portions are set back from the front edge 44 of the central portion sufficiently far that as the snowmobile approaches the ramp the tread moves onto the central portion and transfers weight to the ramp before the skis encounter the inclined surfaces of the side portions and apply a rearward force to the ramp. The ramp has four rear projections 46 adapted to extend into the space between the top and bottom platforms of the turntable where they rest on the bottom platform, a top portion 48 of each rear projection being in close relation to the top platform. On the inclined surface 34 of the central portion of the ramp and also on the top platform 20 of the turntable there are a plurality of raised ridges 50.

When the turntable 16 and ramp 30 are not assembled together, as shown in FIG. 1, the top platform 20 of the turntable can be rotated with respect to the bottom platform 18 on the vertical spindle 24. Rotation of the top platform with respect to the bottom platform is facilitated by the rollers 26 which support the top platform above the bottom platform and roll on the bottom platform. However when the turntable and ramp are assembled together with the ramp extending in front of the turntable, as shown in FIG. 2, the top of the ramp at the rear is in close relation to and about the same height as the top platform of the turntable and blocks the top platform from rotating with respect to the bottom platform.

When the turntable 16 and ramp 30 are assembled together, as shown in FIG. 2, the snowmobile 10 can be driven up the ramp and onto the turntable. Part of any weight on the ramp is transmitted to the bottom platform 18 of the turntable by the rear projections 46 which rest on the bottom platform. As the snowmobile approaches the ramp the skis 14 pass on either side of the central portion 32 and the tread 12 moves onto the central portion 32 and transfers weight to the ramp and bottom platform of the turntable before the skis encounter the inclined surfaces 38 of the side portions 36 and apply a rearward force to the ramp and turntable. When the tread moves onto the central portion and transfers weight to the ramp and bottom platform of the turntable the ground friction is found to be sufficient to withstand the rearward force subsequently applied to the ramp and turntable when the skis encounter the inclined surfaces of the side portions, thus preventing the ramp and turntable from being pushed rearward ahead of the snowmobile even when the ramp and turntable are constructed from lightweight material such as plywood. As the tread of the snowmobile moves up the inclined surface of the central portion of the ramp onto the turntable the skis of the snowmobile encounter the inclined surfaces of the side portions of the ramp and slide up them onto the turntable.

Since the top portions 48 of the rear projections 46 are in close relation to the top platform 20 they serve to limit downward deflection of the top platform as the snowmobile is driven onto the turntable.

As the tread of the snowmobile moves up the inclined surface of the central portion of the ramp and advances onto the turntable it grips the raised ridges 50 for better traction.

As the skis of the snowmobile advance onto the turntable the raised guide elements 28 guide the skis ahead between the raised guide elements in a generally straight direction. The raised guide elements 28 also reinforce the top platform 20 of the turntable to limit bending of the top platform as the snowmobile is driven onto the turntable.

Once the snowmobile is resting on the turntable the ramp can be pulled away from the turntable and the turntable can be rotated through 180° to the position shown in FIG. 3. The ramp can then be replaced and the snowmobile can be driven off the turntable and down the ramp in the opposite direction from which it approached.

A turntable and ramp that are operable even when constructed from lightweight material such as plywood have the advantage that they can be portable and easily stored.

Although a preferred embodiment has been described above it is to be understood that other embodiments not incorporating all of the features of the described preferred embodiment, or otherwise modified, would also be operable and within the scope of the claims.

I claim:

1. The combination of a turntable and ramp useful with snowmobiles of the type having a tread and two skis extending ahead of the tread on either side, which combination when assembled comprises:

a. a turntable having a bottom platform and a top platform, b. a ramp extending in front of the turntable with the top of the ramp at the rear in close relation to and about the same height as the top platform of the turntable, the ramp having a central portion with an inclined surface up which the tread of the snowmobile can move, the central portion being sufficiently narrow to allow the skis of the snowmobile to pass on either side, and the ramp having, on either side of the central portion, two side portions with inclined surfaces up which the skis of the snowmobile can slide, the inclined surfaces of the side portions being set back from the front edge of the central portion sufficiently far that as the snowmobile approaches the ramp the tread moves onto the central portion and transfers weight to the ramp before the skis encounter the inclined surfaces of the side portions and apply a rearward force to the ramp.

2. The combination claimed in claim 1 wherein the ramp has a rear projection adapted to rest on the bottom platform of the turntable and transmit to the bottom platform part of any weight on the ramp.

3. The combination claimed in claim 1 wherein the top platform of the turntable is spaced above the bottom platform and the ramp has a plurality of rear projections adapted to extend into the space between the top and bottom platforms of the turntable where they rest on the bottom platform and transmit to the bottom platform part of any weight on the ramp, a top portion of each rear projection being in close relation to the top platform so as to limit downward deflection of the top platform as the snowmobile is driven onto the turntable.

4. The combination claimed in claim 1 wherein, when the turntable and ramp are not assembled together, the top platform of the turntable can be rotated with respect to the bottom platform but, when the turntable and ramp are assembled together, the ramp blocks the top platform of the turntable from rotating with respect to the bottom platform.

5. The combination claimed in claim 1 wherein the top platform of the turntable is rotatable with respect to the bottom platform on a vertical spindle attached to the bottom platform and a plurality of rollers are located between the top and bottom platforms near the outer edges to support the top platform above the bottom platform and to facilitate rotation of the top platform with respect to the bottom platform.

6. The combination claimed in claim 1 wherein, on the inclined surface of the central portion of the ramp and also on the top platform of the turntable, there are raised ridges which the tread of the snowmobile can grip.

7. The combination claimed in claim 1 wherein there are raised guide elements on the top platform of the turntable which reinforce the top platform and guide the skis of the snowmobile ahead in a generally straight direction as the snowmobile advances onto the turntable.

* * * * *